(12) United States Patent
Kim et al.

(10) Patent No.: US 8,587,619 B2
(45) Date of Patent: Nov. 19, 2013

(54) DISPLAY APPARATUS AND METHOD OF DRIVING THE SAME

(75) Inventors: Sung-Woon Kim, Suwon-si (KR); Yong-Hwan Shin, Yongin-si (KR); Hwa-Sung Woo, Suwon-si (KR); Hee-Seop Kim, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 1118 days.

(21) Appl. No.: 12/143,920

(22) Filed: Jun. 23, 2008

(65) Prior Publication Data
US 2009/0091587 A1    Apr. 9, 2009

(30) Foreign Application Priority Data
Oct. 9, 2007   (KR) .................. 10-2007-0101581

(51) Int. Cl.
*G09G 5/10* (2006.01)
*G09G 3/30* (2006.01)

(52) U.S. Cl.
USPC ............................... 345/690; 345/89

(58) Field of Classification Search
USPC ............................. 345/87, 89, 690
See application file for complete search history.

(56) References Cited

U.S. PATENT DOCUMENTS

| 2003/0197824 A1* | 10/2003 | Shim et al. ............ 349/139 |
| 2006/0164356 A1* | 7/2006 | Yang et al. ............ 345/89 |
| 2008/0024707 A1* | 1/2008 | Jones ............ 349/134 |

FOREIGN PATENT DOCUMENTS

| JP | 2001159759 | 6/2001 |
| JP | 2002365657 | 12/2002 |
| KR | 102000060543 | 10/2000 |

* cited by examiner

*Primary Examiner* — Jonathan Boyd
(74) *Attorney, Agent, or Firm* — H.C. Park & Associates, PLC

(57) ABSTRACT

A display apparatus includes a first display plate, a first electrode and a second electrode disposed on the first display plate, a second display plate, a third electrode disposed on the second display plate, and a liquid crystal layer disposed between the first display plate and the second display plate. The liquid crystal layer includes liquid crystal molecules oriented substantially perpendicular to the first display plate and the second display plate in a state where no voltage is applied to the first to third electrodes. When a display state is to change from a first grayscale in a first grayscale region to a second grayscale in a second grayscale region, a return voltage, which is larger than the sum of the common voltage and a threshold voltage of the liquid crystal molecules, is applied to the first electrode and the second electrode for at least a specified period before the first drive voltage and the second drive voltage, which correspond to the second grayscale, are applied to the first electrode and the second electrode.

15 Claims, 5 Drawing Sheets

DISPLAY APPARATUS AND METHOD OF DRIVING THE SAME

CROSS-REFERENCE TO RELATED APPLICATION

This application claims priority from and the benefit of Korean Patent Application No. 10-2007-0101581, filed on Oct. 9, 2007, which is hereby incorporated by reference for all purposes as if fully set forth herein.

BACKGROUND OF THE INVENTION

1. Field of the Invention

The present invention relates to a display apparatus and a method of driving the same, and more particularly to a display apparatus that may have a wide viewing angle, high contrast characteristics, and a high response speed, and a method of driving the same.

2. Discussion of the Background

A liquid crystal display (LCD) device is a device that displays an image by adjusting the light transmission ratio of liquid crystals using an electric field.

An LCD has diverse display modes according to the molecular arrangement of the liquid crystals. Due to advantages in the manufacturing processes, Twisted Nematic (TN) mode, Patterned Vertical Alignment (PVA) mode, and Electrically Controlled Birefringence (ECB) mode have been mainly used. Particularly, in a TN or ECB mode LCD, liquid crystal molecules initially oriented horizontal with a substrate become oriented almost perpendicular to the substrate when a voltage is applied thereto. Accordingly, due to the refractive anisotropy of the liquid crystal molecules, the viewing angle of the LCD may be narrowed when the voltage is applied.

By contrast, in an Electrically-induced Optical Compensation (EOC) mode LCD, two electrodes are arranged parallel to each other on two opposite substrates, respectively, and liquid crystal molecules having positive dielectric anisotropy are oriented perpendicular to the opposite substrates. When a voltage is applied to the two opposite electrodes, the perpendicularly oriented liquid crystals move in a horizontal direction to adjust the light transmission ratio, so that high contrast characteristics and wide viewing angle characteristics may be obtained.

However, in comparison to the time $T_{on}$ required to change the orientation of the liquid crystal molecules from vertical orientation to horizontal orientation when an electric field is applied between the two electrodes, the time $T_{off}$ required to make horizontally oriented liquid crystal molecules return to the vertical orientation state when the electric field between the two electrodes is removed is relatively long. Accordingly, in the event that the grayscale is changed from a high grayscale to a low grayscale, the response time may be increased, thereby deteriorating the display quality of the LCD.

SUMMARY OF THE INVENTION

The present invention provides a display apparatus that may have improved display qualities.

The present invention also provides a method of driving the above-described display apparatus.

Additional features of the invention will be set forth in the description which follows, and in part will become apparent from the description, or may be learned by practice of the invention.

The present invention discloses a display apparatus including a first display plate, a first electrode disposed on the first display plate, the first electrode to receive a first drive voltage, a second electrode disposed on the first display plate, the second electrode to receive a second drive voltage, a second display plate, a third electrode disposed on the second display plate, the third electrode to receive a common voltage, and a liquid crystal layer disposed between the first display plate and the second display plate. The liquid crystal layer includes liquid crystal molecules oriented substantially perpendicular to the first display plate and the second display plate in a state where no voltage is applied to the first, second, and third electrodes. When a display state is to change from a first grayscale in a first grayscale region to a second grayscale in a second grayscale region, a return voltage, which is larger than the sum of the common voltage, and a threshold voltage of the liquid crystal molecules is applied to the first electrode and the second electrode before the first drive voltage and the second drive voltage, which correspond to the second grayscale, are applied to the first electrode and the second electrode. The first grayscale region is a region in which a light transmission ratio of the liquid crystal layer is above a first threshold value, and the second grayscale region is a region in which the light transmission ratio of the liquid crystal layer is below a second threshold value that is smaller than the first threshold value.

The present invention also discloses a method of driving a display apparatus including a first electrode and a second electrode on a first display plate, a third electrode on a second display plate, and a liquid crystal layer between the first display plate and the second display plate. The liquid crystal layer includes liquid crystal molecules oriented perpendicular to the first display plate and the second display plate when no voltage is applied to the first electrode, the second electrode, and the third electrode. The method includes applying a common voltage to the third electrode, applying first drive voltages corresponding to a first grayscale in a first grayscale region to the first electrode and the second electrode, the first grayscale region being a region in which a light transmission ratio of the liquid crystal layer is above a first threshold value, applying return voltages to the first electrode and the second electrode, the return voltages each being larger than the sum of the common voltage and a threshold voltage of the liquid crystal molecules, and applying second drive voltages corresponding to a second grayscale in a second grayscale region to the first electrode and the second electrode, the second grayscale region being a region in which the light transmission ratio of the liquid crystal layer is below a second threshold value that is smaller than the first threshold value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
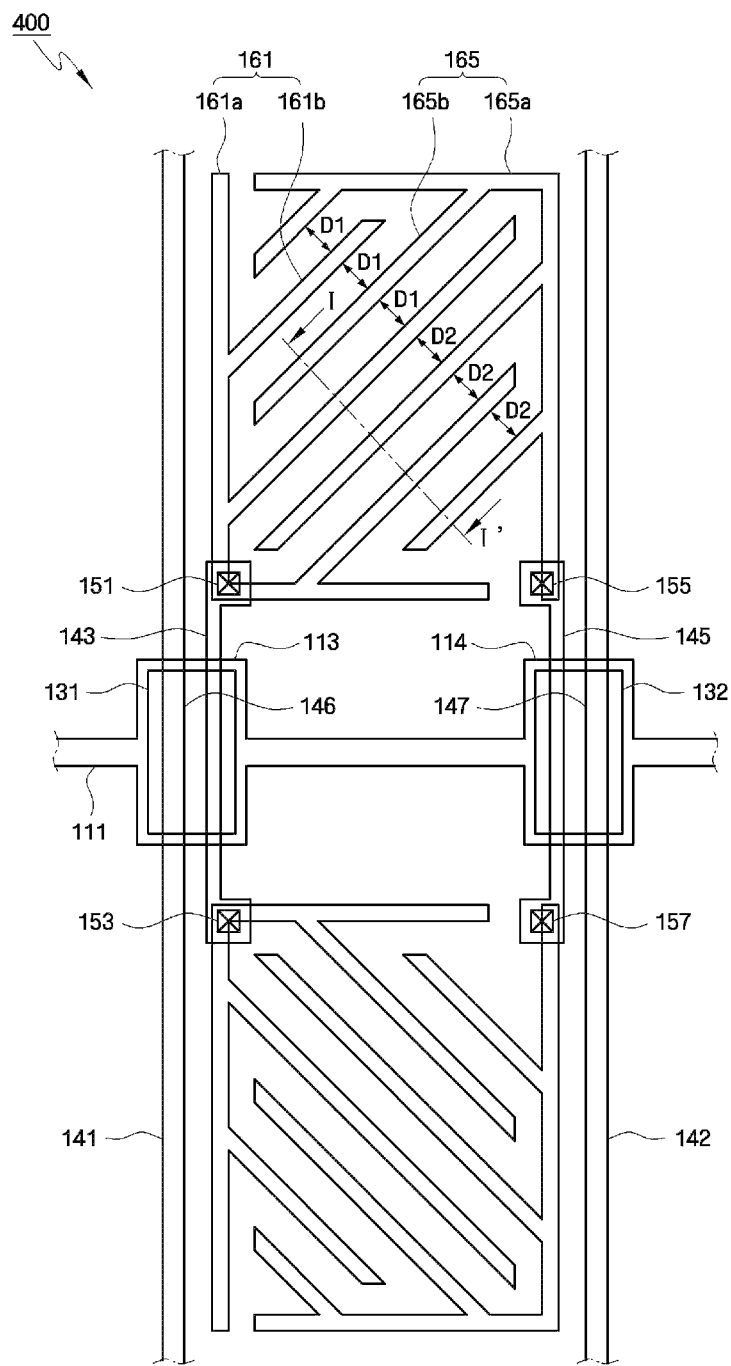
FIG. 1 is an arrangement view showing the structure of a display apparatus according to an exemplary embodiment of the present invention.

This invention is described more fully hereinafter with reference to the accompanying drawings, in which embodiments of the invention are shown. This invention may, however, be embodied in many different forms and should not be construed as being limited to the embodiments set forth herein. Rather, these embodiments are provided so that this disclosure is thorough, and will fully convey the concept of the invention to those skilled in the art. In the drawings, the size and relative sizes of layers and regions may be exaggerated for clarity. Like reference numerals in the drawings denote like elements.

It will be understood that when an element or layer is referred to as being "on", "connected to", or "coupled to" another element or layer, it can be directly on, connected to, or coupled to the other element or layer or intervening elements or layers may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Exemplary embodiments described herein will be described referring to plan views and/or cross-sectional views by way of ideal schematic views of the invention. Accordingly, the exemplary views may be modified depending on manufacturing technologies and/or tolerances. Therefore, the exemplary embodiments of the invention are not limited to those shown in the views, but include modifications in configuration formed on the basis of manufacturing processes. Therefore, regions exemplified in figures have schematic properties and shapes of regions shown in figures exemplify specific shapes of regions of elements and not limit aspects of the invention.

Figure 2:
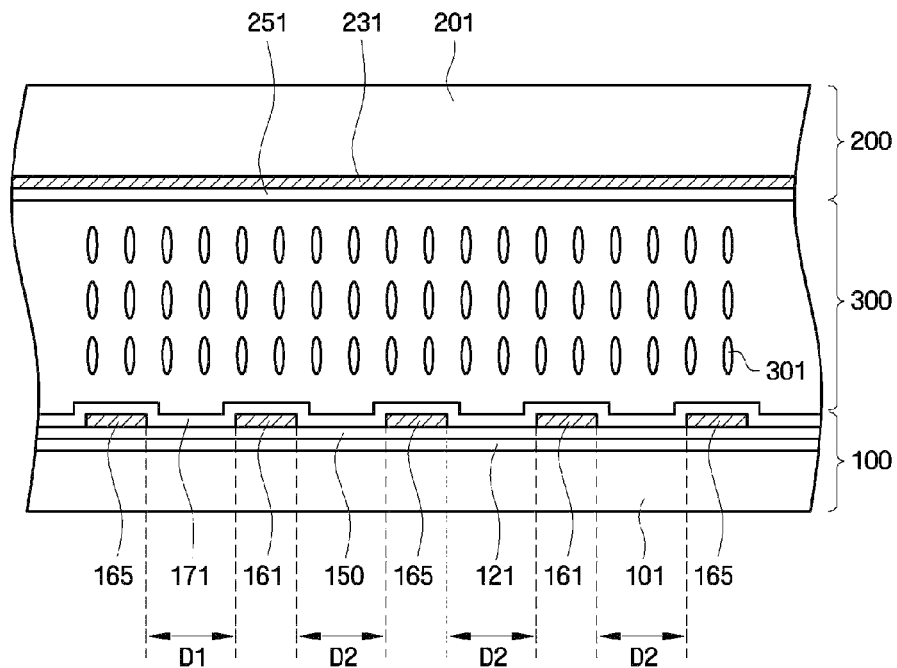
FIG. 2 is a sectional view taken along line I-I' of FIG. 1 when no electric field is formed in the display apparatus of FIG. 1.

Hereinafter, with reference to FIG. 1, FIG. 2, and FIG. 3, a display apparatus according to an exemplary embodiment of the present invention will be described. FIG. 1 is an arrangement view showing the structure of a display apparatus according to an exemplary embodiment of the present invention. FIG. 2 is a sectional view taken along line I-I' of FIG. 1 when no electric field is formed in the display apparatus of FIG. 1, and FIG. 3 is a sectional view taken along line I-I' of FIG. 1 when an electric field is formed in the display apparatus of FIG. 1.

Figure 3:
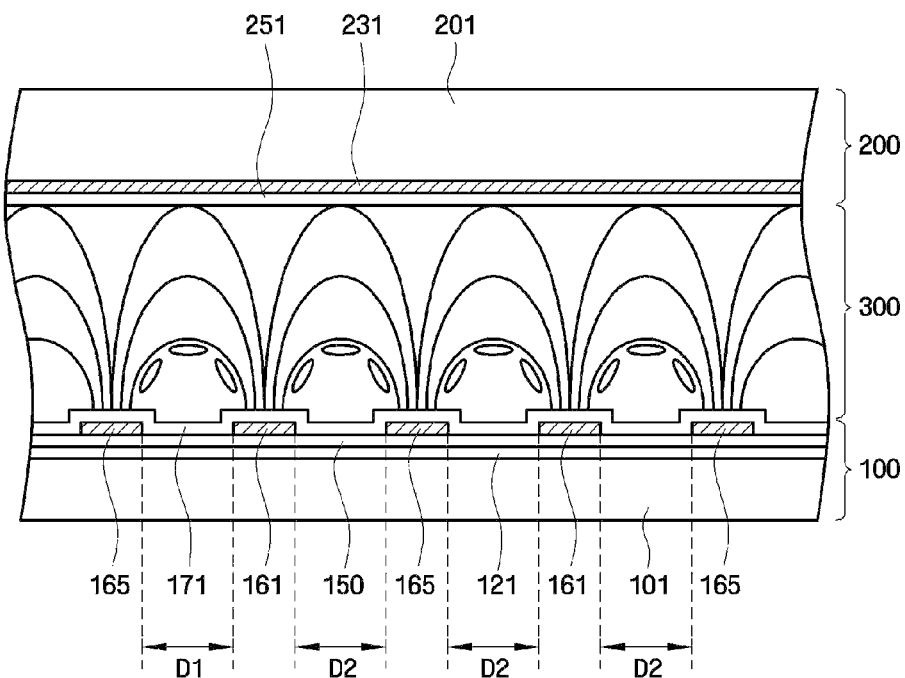
FIG. 3 is a sectional view taken along line I-I' of FIG. 1 when an electric field is formed in the display apparatus of FIG. 1.

Referring to FIG. 1, FIG. 2, and FIG. 3, a display apparatus 400 according to an exemplary embodiment of the present invention includes a first display plate 100 in which a thin film transistor array is arranged, a second display plate 200 that is opposite to the first display plate 100, and a liquid crystal layer 300 interposed between the first display plate 100 and the second display plate 200.

In the display apparatus 400 according to an exemplary embodiment of the present invention, a first electrode 161 and a second electrode 165 for forming an electric field are disposed on the first display plate 100. The first electrode 161 and the second electrode 165 may be arranged at diverse electrode distances in one pixel area. When no electric field is applied, liquid crystal molecules 301 in the liquid crystal layer 300 are arranged perpendicular to the first display plate 100 and the second display plate 200.

A plurality of gate lines 111 are disposed on an insulating substrate 101, which may be made of transparent glass or plastic. The gate lines 111 extend in a horizontal direction and transfer gate signals. A plurality of first and second gate electrodes 113 and 114 are arranged to project upward and downward from the respective gate lines 111. The gate lines 111 and the first and second gate electrodes 113 and 114 are referred to as gate wires.

The gate wires 111, 113, and 114 may be made of an aluminum series metal such as aluminum (Al) or aluminum alloy, a silver series metal such as silver (Ag) or silver alloy, a copper series metal such as copper (Cu) or copper alloy, a molybdenum series metal such as molybdenum (Mo) or molybdenum alloy, chrome (Cr), tantalum (Ta), or titanium (Ti). Also, the gate wires 111, 113, and 114 may have a multilayer structure that includes two conductive layers (not shown) having different physical properties. For example, the multilayer structure may include a chrome lower layer and an aluminum (alloy) upper layer, or an aluminum (alloy) lower layer and a molybdenum (alloy) upper layer. The gate wires 111, 113, and 114 may be made of diverse kinds of metal or conductors.

A sustain electrode (not shown), which may be made of the same material as the gate line 111, may also be disposed on the same layer as the gate line 111.

A gate insulating layer 121, which may be made of silicon nitride ($SiN_x$) or silicon dioxide ($SiO_x$), is disposed on the gate line 111.

First and second island-shaped semiconductor layers 131 and 132, which may be made of hydrogenated amorphous silicon (abbreviated to "a-Si") or polysilicon, are disposed on the gate insulating layer 121. The first and second semiconductor layers 131 and 132 overlap the first and second gate electrodes 113 and 114, respectively.

Island-shaped ohmic contact layers (not shown) are disposed on the first and second semiconductor layers 131 and 132, respectively. The ohmic contact layers may be made of n+ hydrogenated amorphous silicon doped with high-density n-type impurities such as phosphorus (P), or silicide. The ohmic contact layer is arranged between the first semiconductor layer 131 and a first source electrode 146 and between the first semiconductor layer 131 and a first drain electrode 143, respectively, to lower the contact resistance therebetween. In the same manner, the ohmic contact layer is arranged between the second semiconductor layer 132 and a second source electrode 147 and between the second semiconductor layer 132 and a second drain electrode 145, respectively, to lower the contact resistance therebetween.

First and second data lines 141 and 142, the first and second source electrodes 146 and 147, and the first and second drain electrodes 143 and 145 are disposed on the ohmic contact layers and the gate insulating layer 121. The first and second data lines 141 and 142 transfer data signals, and extend in a vertical direction to cross the gate line 111. The first and second source electrodes 146 and 147 are disposed on the first and second data lines 141 and 142, respectively. In an exemplary embodiment of the present invention, as shown in FIG. 1, the first and second source electrodes 146 and 147 are portions of the first and second data lines 141 and 142 that are opposite to the first and second drain electrodes 143 and 145, respectively. In this case, the first and second source electrodes 146 and 147 do not project from the first and second data lines 141 and 142, respectively. However, the first and second source electrodes 146 and 147 may have other configurations. For example, they may extend from the first and second data lines 141 and 142 and be opposite to the first and second drain electrodes 143 and 145. The first and second data lines 141 and 142, the first and second drain electrodes 143 and 145, and first and second source electrodes 146 and 147, as described above, are referred to as data wires.

The data wires 141, 142, 143, 145, 146, and 147 may be made of a refractory metal, such as molybdenum, chrome, tantalum, titanium, or their alloys, and may have a multilayer structure. For example, the multilayer structure may be a double layer composed of a chrome or molybdenum (alloy) lower layer and an aluminum (alloy) upper layer, or a triple layer composed of a molybdenum (alloy) lower layer, an aluminum (alloy) intermediate layer, and a molybdenum (alloy) upper layer. The data wires 141, 142, 143, 145, 146, and 147 may be made of diverse kinds of metals or conductors in addition to the above-described materials.

The first gate electrode 113, the first source electrode 146, and the first drain electrode 143 constitute a first thin film transistor (TFT) along with the first semiconductor layer 131, and the second gate electrode 114, the second source electrode 147, and the second drain electrode 145 constitute a second TFT along with the second semiconductor layer 132. Channels of the first and second TFTs are formed in the portions of the first semiconductor layers 131 and 132 between the first and second drain electrodes 143 and 145 and the first and second source electrodes 146 and 147, respectively.

In the display apparatus according to an exemplary embodiment of the present invention, first and second TFTs are arranged in one pixel area, and the first TFT is connected to a first electrode 161 to be described below while the second TFT is connected to a second electrode 165 to be described below.

A passivation layer 150 is disposed on the data wires 141, 142, 143, 145, 146, and 147 and exposed portions of the first and second semiconductor layers 131 and 132. The passivation layer 150 may include an inorganic insulating layer made of silicon nitride ($SiN_x$) or silicon dioxide ($SiO_x$). Also, the passivation layer 150 may include an organic insulator having a low dielectric constant, and may be photosensitive. For example, the passivation layer 150 may include an acrylic series organic insulator, and may have a thickness of about 2.5 to 5 μm.

A plurality of contact holes 151, 153, 155, and 157 are formed in the passivation layer 150 to expose both ends of each of the first and second drain electrodes 143 and 145, respectively.

The first electrode 161 and the second electrode 165 are disposed on the passivation layer 150. The first electrode 161 and the second electrode 165 may include a transparent conductive material, such as Indium Tin Oxide (ITO) or Indium Zinc Oxide (IZO). In order to form an electric field, different voltages may be applied to the first electrode 161 and the second electrode 165. In the display apparatus 400 according to an exemplary embodiment of the present invention, the first electrode 161 and the second electrode 165 are disposed on the same layer. However, the first electrode 161 and the second electrode 165 may be disposed on different layers.

The first electrode 161 includes a plurality of first branch electrodes 161b having a specified inclination angle to a length direction of the gate line 111. The first branch electrodes 161b are substantially parallel to one another. In an exemplary embodiment of the present invention, the length direction of the first branch electrode 161b may be inclined at an angle of 0° to 60° with respect to the length direction of the gate line 111.

The first electrode 161 includes a first trunk electrode 161a that connects the first branch electrodes 161b together. In an exemplary embodiment of the present invention, the first trunk electrode 161a includes a portion that is substantially parallel to the length direction of the gate line 111 and a portion that is substantially parallel to the length direction of the first and second data lines 141 and 142.

In an exemplary embodiment of the present invention, the first branch electrodes 161b have a symmetrical structure with respect to the gate line 111 disposed in the center of the pixel area. That is, the first branch electrode 161b is divided into a first upper branch electrode and a first lower branch electrode. On the other hand, the first trunk electrode 161a also has a symmetrical structure on the basis of the gate line 111 disposed in the center of the pixel area. That is, the first trunk electrode 161a is divided into a first upper trunk electrode and a first lower trunk electrode.

The second electrode 165 also includes second branch electrodes 165b and a second trunk electrode 165a. The second electrode 165 may have a shape similar to that of the first electrode 161, and is insulated from the first electrode 161. In addition, the second trunk electrode 165a and the first trunk electrode 161a may cross each other.

In an exemplary embodiment of the present invention, the second electrode 165 includes a plurality of second branch electrodes 165b having a specified inclination angle with respect to the length direction of the gate line 111. The second branch electrodes 165b are substantially parallel to one another. In an exemplary embodiment of the present invention, the length direction of the second branch electrode 165b may be inclined at angle of 0° to 60° with respect to the length direction of the gate line 111.

The second electrode 165 includes a second trunk electrode 165a that connects the second branch electrodes 165b together. In an exemplary embodiment of the present invention, the second trunk electrode 165a includes a portion that is substantially parallel to the length direction of the gate line 111 and a portion that is substantially parallel to the length direction of the first and second data lines 141 and 142.

In an exemplary embodiment of the present invention, the second branch electrodes 165b have a symmetrical structure with respect to the gate line 111 disposed in the center of the pixel area. That is, the second branch electrode 165b is divided into a second upper branch electrode and a second lower branch electrode. On the other hand, the second trunk electrode 165a also has a symmetrical structure with respect to the gate line 111 disposed in the center of the pixel area. That is, the second trunk electrode 165a is divided into a second upper trunk electrode and a second lower trunk electrode.

In the display apparatus according to an exemplary embodiment of the present invention, a first electrode distance D1 between the first branch electrode 161*b* and the second branch electrode 165*b* disposed in a first area may differ from a second electrode distance D2 between the first branch electrode 161*b* and the second branch electrode 165*b* disposed in a second area. In the display apparatus according to an exemplary embodiment of the present invention, the first branch electrode 161*b* and the second branch electrode 165*b* in a first area have a first electrode distance D1 and the first branch electrode 161*b* and the second branch electrode 165*b* in a second area have a second electrode distance D2, respectively. However, in other exemplary embodiments, the first branch electrodes 161*b* and the second branch electrodes 165*b* may be arranged at diverse electrode distances.

In an exemplary embodiment of the present invention, the first electrode distance D1 and the second electrode distance D2 may be, for example, in the range of 4 μm to 20 μm, and the difference between the first electrode distance D1 and the second electrode distance D2 may be, for example, in the range of 1 μm to 6 μm. In the display apparatus according to an exemplary embodiment of the present invention, the width of the first electrode 161 and the second electrode 165 may be in the range of 1 μm to 6 μm.

The first electrode 161 is connected to the first drain electrode 143 through the first contact hole 151 and the second contact hole 153, and the second electrode 165 is connected to the second drain electrode 145 through the third contact hole 155 and the fourth contact hole 157.

A first orientation layer 171 is disposed on the first electrode 161 and the second electrode 165.

The second display plate 200 includes an insulating substrate 201, which may be made of transparent glass or plastic. A plurality of color filters (not shown) is disposed on the insulating substrate 201, a third electrode 231 is disposed on the color filter, and a second orientation layer 251 is disposed on the third electrode 231. A light-shielding layer (not shown) or a smoothing layer (not shown) may also be included on the second display plate 200.

In the display apparatus 400 according to an exemplary embodiment of the present invention, a separate common electrode is not disposed on the second display plate 200. However, in other exemplary embodiments, a separate front common electrode may be disposed on the second display plate 200.

In the display apparatus according to an exemplary embodiment of the present invention, vertical orientation layers may be used as a first orientation layer 171 and a second orientation layer 251.

A liquid crystal layer 300 is disposed between the first display plate 100 and the second display plate 200. The liquid crystal layer 300 includes liquid crystal molecules 301 having positive dielectric anisotropy.

Hereinafter, the operation of the display apparatus according to an exemplary embodiment of the present invention will be described with reference to FIG. 2 and FIG. 3.

Referring to FIG. 2, when no electric field is formed in the display apparatus, the liquid crystal molecules 301 are arranged substantially perpendicular to surfaces of the insulating substrates 101 and 201. In this case, the polarization state of light passing through the first display plate 100 and the second display plate 200 does not change. Accordingly, when lower and upper polarization plates (not shown) are arranged on outer sides of the first and second display plates 100 and 200, respectively, and the transmission axis of the lower polarization plate is arranged perpendicular to the transmission axis of the upper polarization plate, the display is in a dark state.

Referring to FIG. 3, when an electric field is formed in the display apparatus, a horizontal electric field is formed in the neighborhood of the first electrode 161 and the second electrode 165, and the liquid crystal molecules 301 having positive dielectric anisotropy are arranged in the direction of the electric field. In this case, the liquid crystal molecules 301 change the polarization state of light passing through the lower display plate 100 so that light may pass through the upper display plate 200 with the changed polarization state, thereby permitting display of an image.

In an exemplary embodiment of the present invention, the transmission axis of the upper polarization plate and the transmission axis of the lower polarization plate are arranged perpendicular to each other. However, in other exemplary embodiments, the transmission axis of the upper polarization plate and the transmission axis of the lower polarization plate are arranged parallel to each other.

Different voltages may be applied to the first electrode 161 and the second electrode 165 to form an electric field therebetween. In the display apparatus 400 according to an exemplary embodiment of the present invention, voltages that have the same difference (i.e., the same absolute value) from a reference voltage, but different polarities, may be applied to the first electrode 161 and the second electrode 165, respectively, to implement the display of a white state. For example, in order to implement the display of a white state when a reference voltage of 6 V is applied, 12 V may be applied to the first electrode 161 and 0 V may be applied to the second electrode 165. Alternatively, when a reference voltage of 0 V is applied, 6 V may be applied to the first electrode 161 and −6 V may be applied to the second electrode 165. On the other hand, to implement the display of a black state, 6 V may be applied to both the first electrode 161 and the second electrode 165.

Hereinafter, the operation of the display apparatus according to an exemplary embodiment of the present invention will be described with reference to FIG. 4A, FIG. 4B, and FIG. 4C. As the display state changes from a first grayscale in a first grayscale region, in which a light transmission ratio of the liquid crystal layer 300 is above a first threshold value, to a second grayscale in a second grayscale region, in which the light transmission ratio of the liquid crystal layer 300 is below a second threshold value that is smaller than the first threshold value, the liquid crystal molecules 301 move as follows. For the sake of convenience in explanation, the first threshold value corresponds to the maximum light transmission ratio, and the second threshold value corresponds to the minimum light transmission ratio.

Figure 4A:
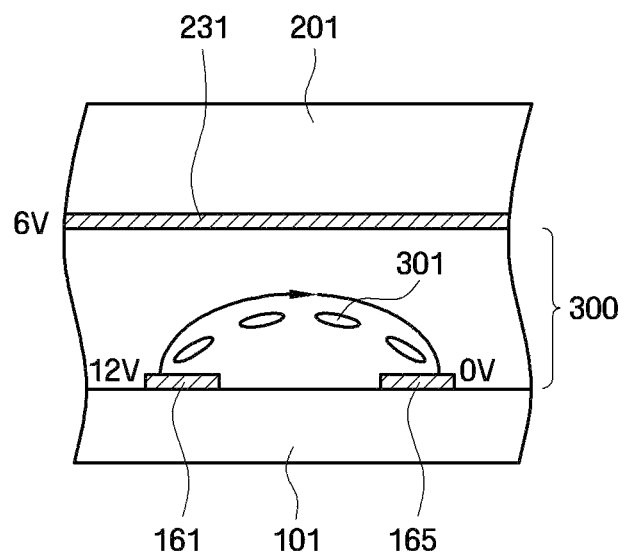
FIG. 4A, FIG. 4B, and FIG. 4C are views briefly explaining the operation of a display apparatus according to an exemplary embodiment of the present invention when pixels are changed from a full-white state, in which the pixels have the maximum light transmission ratio, to a full-black state, in which the pixels have the minimum light transmission ratio.
Figure 4B:
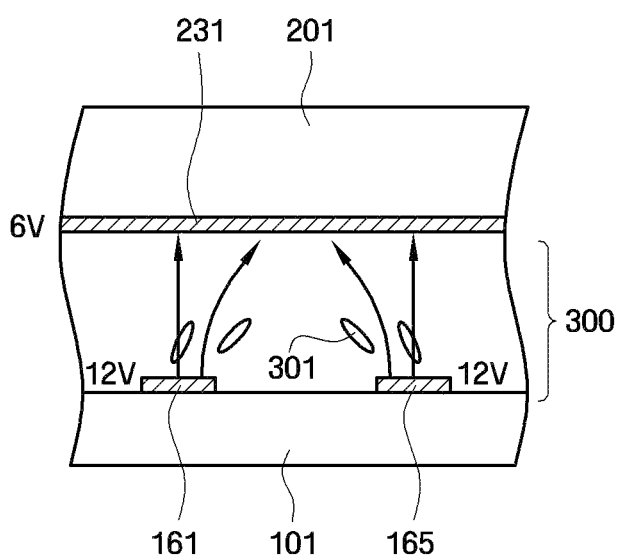
Figure 4C:
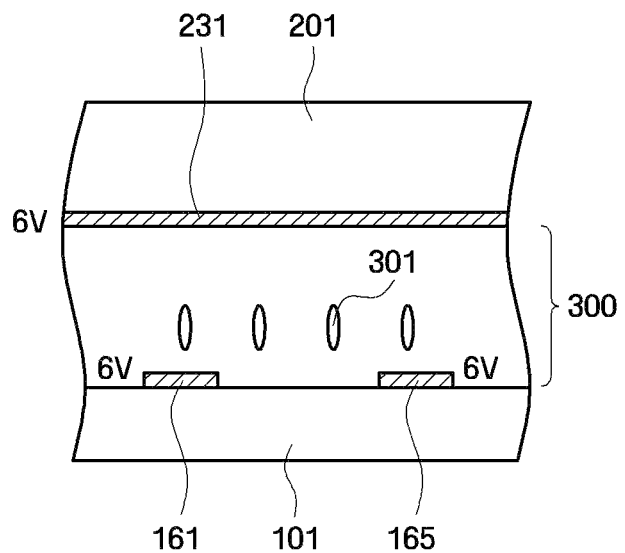

FIG. 4A, FIG. 4B, and FIG. 4C are views explaining the operation of a display apparatus according to an exemplary embodiment of the present invention when pixels are changed from a full-white state, in which the pixels have the maximum light transmission ratio, to a full-black state, in which the pixels have the minimum light transmission ratio.

First, as shown in FIG. 4A, since 12 V is applied to the first electrode 161 and 0 V is applied to the second electrode 165 in a full-white state, an electric field that corresponds to the voltage difference between the two electrodes, i.e., 12 V, is formed, and the major axes of the liquid crystal molecules 301 become nearly horizontal with the first insulating substrate 101.

In this state, if it is intended that the liquid crystal molecules 301 return to their initial orientation state, i.e. the vertical orientation state, to display a full-black state as shown in FIG. 4B, the electric field in a horizontal direction is removed by eliminating the voltage difference between the first electrode 161 and the second electrode 165, and simultaneously, the vertical electric field is formed by applying a voltage having a level that is different from that of a third electrode 231 to the first electrode 161 and the second electrode 165, so that the vertical-orientation return speed of the liquid crystal molecules 301 having positive dielectric anisotropy may be increased. That is, a return voltage, which is higher than the sum of the common voltage and the threshold voltage of the liquid crystal molecules 301, is applied to the first electrode 161 and the second electrode 165. Here, the threshold voltage of the liquid crystal molecules 301 refers to a drive voltage when the luminance change caused by applying the voltage to the liquid crystal cells reaches a specific percentage, e.g. 10%, of the entire changeable amount of luminance change.

For example, if 12 V is applied to both the first electrode 161 and the second electrode 165, the electric field between the two electrodes is removed, and the vertical electric field that corresponds to the voltage difference of 6 V is formed between the third electrode 231 and the first electrode 161 and between the third electrode 231 and the second electrode 165, respectively. Accordingly, the major axis of the liquid crystal molecules 301 may be rapidly rotated by the vertical electric field to reach an almost vertical state.

If the return of the liquid crystal molecules 301 to the vertical orientation state is performed by the vertical electric field, as shown in FIG. 4C, the same voltage, which is applied during the display of a full-black state, is applied to the first electrode 161, the second electrode 165, and the third electrode 231 after the lapse of a specified time. For example, 6 V is applied to the first electrode 161 and the second electrode 231. At this time, since the vertical electric field between the third electrode 231 and the first electrode 161 and between the third electrode 231 and the second electrode 165 is removed, a complete return to the initial vertical orientation state is performed by an elastic restoration force of the liquid crystal molecules 301. If the whole electric field is removed and the liquid crystal molecules 301 return to their initial vertical orientation state, the light passing through the liquid crystal layer 300 is intercepted by the polarization plate, and thus the pixels enter the full-black state, in which no light is transmitted.

As described above, the transmission ratio changes from the full-white state to the full-black state. However, similar operations may be performed when the transmission ratio changes from a high-grayscale display state to a low-grayscale display state.

Figure 6:
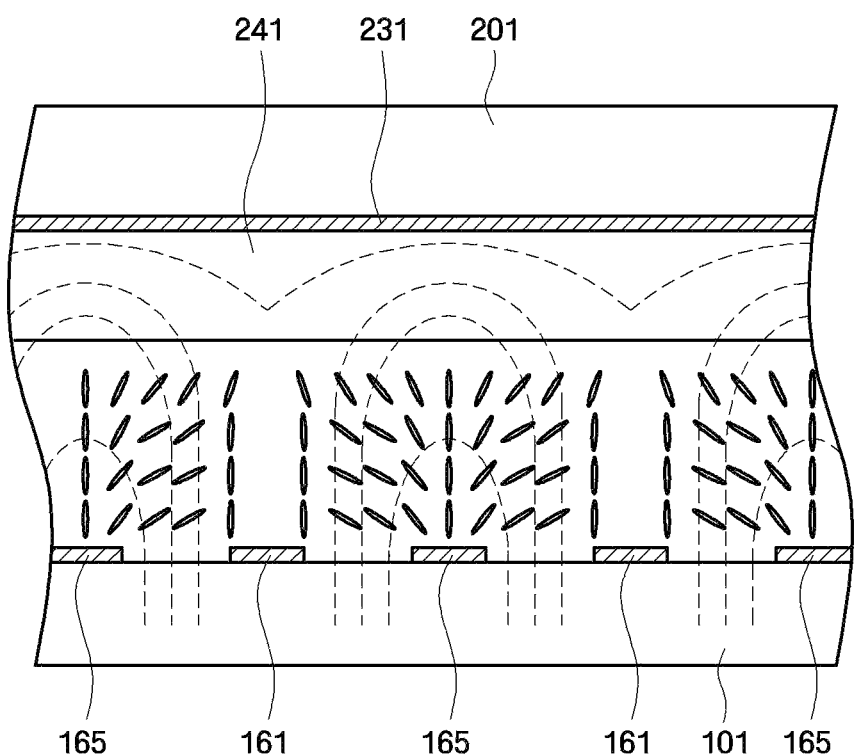
FIG. 6 is a view showing a display apparatus having a dielectric layer, in which an electric field is formed, according to an exemplary embodiment of the present invention.

As shown in FIG. 6, the display apparatus according to exemplary embodiments of the present invention may further include a dielectric layer 241 disposed between the third electrode 231 and the liquid crystal layer 300 to minimize the influence of the electric field formed between the first electrode 161 and the third electrode 231, and between the second electrode 165 and the third electrode 231 when the light is transmitted by the horizontal electric field between the first electrode 161 and the second electrode 165.

Figure 5:
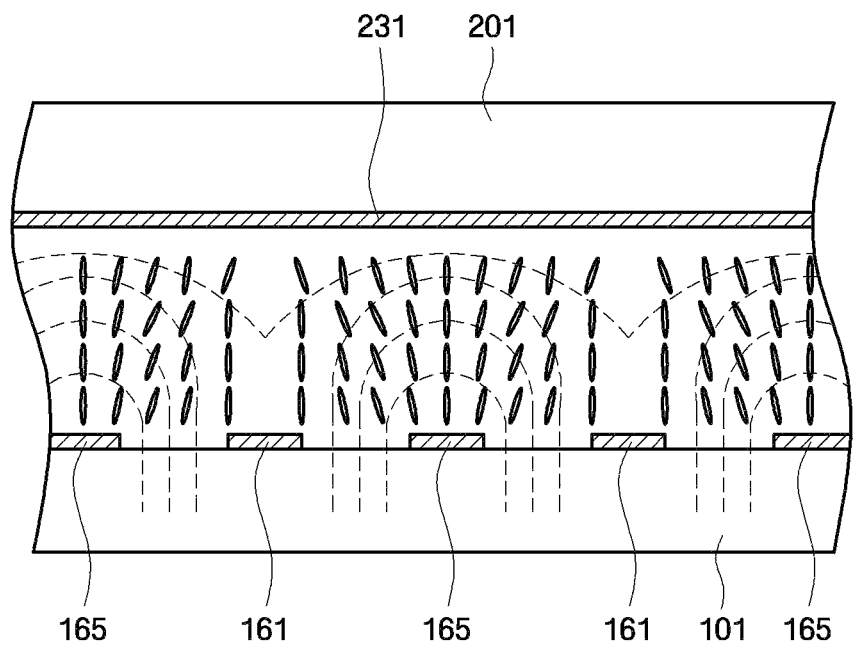
FIG. 5 is a view showing a display apparatus having no dielectric layer, in which an electric field is formed, according to an exemplary embodiment of the present invention.

FIG. 5 and FIG. 6 are views explaining the function of the dielectric layer 241. FIG. 5 is a view showing a display apparatus having no dielectric layer, in which an electric field is formed, according to an exemplary embodiment of the present invention, and FIG. 6 is a view showing a display apparatus having a dielectric layer, in which an electric field is formed, according to an exemplary embodiment of the present invention.

As shown in FIG. 5, the electric field is concentrated in the area around the first electrode 161, and an equipotential line formed around the first electrode 161 remains in the liquid crystal layer 300. Since the electric field in the liquid crystal layer 300 may be strong in a direction perpendicular to the third electrode 231, the inclined electric field may become insufficiently inclined due to its strong normal component. Accordingly, the liquid crystal layer 300 may not provide a sufficient double-refraction characteristic.

In FIG. 6, the equipotential line extends from the liquid crystal layer 300 to the dielectric layer 241, and thus, the concentration of the electric field in the liquid crystal layer 300 is relieved. Accordingly, in the liquid crystal layer 300, the strength of the electric field formed perpendicular to the third electrode 231 weakens, which may cause the normal component of the inclined electric field to weaken, thereby sufficiently inclining the electric field. Consequently, the influence of the vertical electric field may be minimized, and thus, the liquid crystal molecules 301 may be sufficiently inclined under the influence of the horizontal electric field.

The dielectric layer 241 may include a photopolymer resin, a thermosetting resin, a positive or negative resist, polyamic acid or other organic resin (e.g., epoxy resin, acrylic resin, or fluorine resin), silicon dioxide (SiO or $SiO_2$), silicon nitride (SiN), and so forth.

As described above, according to the display apparatus of exemplary embodiments of the present invention, by forming a vertical electric field in a liquid crystal layer 300 when the display state changes from a high grayscale to a low grayscale, the liquid crystal molecules 301 may be promptly returned to their initial vertical orientation state, and thus the display quality may be improved.

In addition, by forming a dielectric layer 241 on the third electrode 231 that forms the vertical electric field, the influence of the vertical electric field upon the grayscale display through the horizontal electric field may be minimized.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display apparatus, comprising:
    a first display plate;
    a first electrode disposed on the first display plate, the first electrode to receive a first drive voltage;
    a second electrode disposed on the first display plate, the second electrode to receive a second drive voltage;
    a second display plate;
    a third electrode disposed on the second display plate, the third electrode to receive a common voltage; and
    a liquid crystal layer disposed between the first display plate and the second display plate, the liquid crystal layer comprising liquid crystal molecules configured to move according to a difference between the first drive voltage and the second drive voltage;
    wherein when a display state is to change from a first grayscale in a first grayscale region to a second grayscale in a second grayscale region, a return voltage, which is larger than the sum of the common voltage and a threshold voltage of the liquid crystal molecules, is applied to the first electrode and the second electrode to eliminate a voltage difference between the first electrode and the second electrode, the return voltage being applied before the first drive voltage and the second drive voltage, which correspond to the second grayscale, are applied to the first electrode and the second electrode, and wherein the first grayscale region is a region in which a light transmission ratio of the liquid crystal layer is greater than or equal to a first threshold value and the second grayscale region is a region in which the light transmission ratio of the liquid crystal layer is less than or equal to a second threshold value that is smaller than the first threshold value.

2. The display apparatus of claim 1, wherein the first threshold value corresponds to the maximum light transmission ratio and the second threshold value corresponds to the minimum light transmission ratio.

3. The display apparatus of claim 2, wherein the second display plate further comprises a dielectric layer disposed on the third electrode.

4. The display apparatus of claim 3, wherein the dielectric layer is an organic layer.

5. The display apparatus of claim 3, wherein the dielectric layer is a silicon nitride layer or a silicon dioxide layer.

6. The display apparatus of claim 1, wherein the first display plate further comprises:
- a first thin film transistor connected to the first electrode;
- a second thin film transistor connected to the second electrode;
- a first data line connected to the first thin film transistor;
- a second data line connected to the second thin film transistor; and
- a gate line crossing the first data line and the second data line, the gate line being connected to the first thin film transistor and the second thin film transistor.

7. The display apparatus of claim 6, wherein the first electrode comprises a plurality of first branch electrodes arranged parallel to one another.

8. The display apparatus of claim 7, wherein the first branch electrodes are inclined with respect to a length direction of the gate line.

9. The display apparatus of claim 8, wherein the second electrode comprises a plurality of second branch electrodes arranged parallel to one another.

10. The display apparatus of claim 9, wherein the second branch electrodes are inclined with respect to a length direction of the gate line.

11. The apparatus of claim 1, wherein the threshold voltage is a drive voltage which produces a luminous change in the liquid crystal layer of a predetermined percentage of the entire changeable amount of luminance change.

12. A method of driving a display apparatus comprising a first electrode and a second electrode on a first display plate, a third electrode on a second display plate, and a liquid crystal layer between the first display plate and the second display plate, the method comprising:
- applying a common voltage to the third electrode;
- applying first drive voltages corresponding to a first grayscale in a first grayscale region to the first electrode and the second electrode, the first grayscale region being a region in which a light transmission ratio of the liquid crystal layer is greater than or equal to a first threshold value;
- applying return voltages to the first electrode and the second electrode to eliminate a voltage difference between the first electrode and the second electrode, the return voltages each being larger than the sum of the common voltage and a threshold voltage of the liquid crystal molecules; and
- applying second drive voltages corresponding to a second grayscale in a second grayscale region to the first electrode and the second electrode, the second grayscale region being a region in which the light transmission ratio of the liquid crystal layer is less than or equal to a second threshold value that is smaller than the first threshold value, wherein the liquid crystal layer comprises liquid crystal molecules configured to move according to a difference between the first drive voltages and the second drive voltages.

13. The method of claim 12, wherein the first drive voltage applied to the first electrode differs from the first drive voltage applied to the second electrode.

14. The method of claim 13, wherein the return voltage applied to the first electrode equals the return voltage applied to the second electrode.

15. The method of claim 12, wherein the threshold voltage is a drive voltage which produces a luminous change in the liquid crystal layer of a predetermined percentage of the entire changeable amount of luminance change.

* * * * *